United States Patent
Holcomb et al.

(10) Patent No.: US 6,243,952 B1
(45) Date of Patent: Jun. 12, 2001

(54) CITRUS FRUIT SEGMENTER

(75) Inventors: David A. Holcomb, Seattle; Martin Gaard, Edmonds, both of WA (US)

(73) Assignee: Chef'n Corporation, Seattle, WA (US)

(*) Notice: Subject to any disclaimer, the term of this patent is extended or adjusted under 35 U.S.C. 154(b) by 0 days.

(21) Appl. No.: 09/150,876

(22) Filed: Sep. 10, 1998

(51) Int. Cl.[7] ............... A21C 15/04; A21C 5/08
(52) U.S. Cl. ............. 30/114; 30/123.6; 30/123.7; 425/281
(58) Field of Search ............. 30/123.6, 124, 30/123.7, 114; 425/281, 284, 285

(56) References Cited

U.S. PATENT DOCUMENTS

| | | |
|---|---|---|
| 1,339,367 | 5/1920 | Risdon . |
| 1,538,398 | 5/1925 | Grainge . |
| 1,542,352 * | 6/1925 | Ankeny ............... 30/123.6 |
| 1,614,451 | 1/1927 | Barfield . |
| 1,668,226 | 5/1928 | Barfield . |
| 1,794,800 | 3/1931 | Smith . |
| 2,051,680 | 8/1936 | Collens ............... 146/3 |
| 2,092,550 * | 9/1937 | Davis ............... 30/123.6 |
| 2,257,202 | 9/1941 | Taylor ............... 30/316 |
| 2,301,289 | 11/1942 | Knepper ............... 146/3 |
| 2,321,725 | 6/1943 | Alderfer ............... 30/23 |
| 2,463,166 | 3/1949 | Geier et al. ............... 242/120 |
| 2,503,097 | 4/1950 | Chavez ............... 146/3 |
| 2,733,746 | 2/1956 | Rauner ............... 146/3 |
| 2,737,713 * | 3/1956 | Spafford ............... 30/123.6 |
| 2,797,478 | 7/1957 | Gebhart et al. ............... 30/24 |
| 3,018,808 | 1/1962 | Belk ............... 146/236 |
| 3,045,729 | 7/1962 | Belk et al. ............... 146/3 |
| 3,072,160 | 1/1963 | Grotewold ............... 146/3 |
| 3,073,365 | 1/1963 | Polk, Jr. et al. ............... 146/3 |
| 3,088,507 | 5/1963 | Mulford ............... 146/3 |
| 3,102,566 | 9/1963 | Willis ............... 146/3 |
| 3,105,531 | 10/1963 | Belk ............... 146/3 |
| 3,113,603 | 12/1963 | Gardiner ............... 146/43 |
| 3,888,000 | 6/1975 | Ladlow ............... 30/114 |
| 3,961,418 | 6/1976 | Neveu ............... 30/123.5 |
| 4,580,343 | 4/1986 | Bell, Jr. ............... 30/114 |
| 4,959,903 | 10/1990 | Daoust et al. ............... 30/123.5 |
| 5,337,480 | 8/1994 | Codikow ............... 30/114 |

FOREIGN PATENT DOCUMENTS

| | | |
|---|---|---|
| 275549 | 3/1927 | (CA) . |
| 210822 | 11/1927 | (CA) . |
| 470436 | 1/1951 | (CA) . |
| 756361 | 9/1956 | (GB) . |

* cited by examiner

*Primary Examiner*—Lee Young
(74) *Attorney, Agent, or Firm*—Seed IP Law Group PLLC

(57) ABSTRACT

A one hand-operated citrus fruit segmenter having a handle with a grip on one end and a triangular blade with diverging segmenting surfaces on the other end, a scoop moveable toward the segmenting surfaces to form a closed compartment to entrap a fruit segment for removal from the fruit, an operating mechanism having a pair of finger pads connected to a drive rack that drives a driven rack via a pinion gear, the driven rack connected to the scoop to pivot the scoop toward the fixed blade, the heel of the user's hand pressing against the grip to hold the handle while the fingers of the same hand pull on the finger pads.

14 Claims, 3 Drawing Sheets

CITRUS FRUIT SEGMENTER

TECHNICAL FIELD

This invention relates to hand operated devices for removing an individual segment or a few pluralities of segments using a one-handed operating segmenting device.

BACKGROUND OF THE INVENTION

Numerous patents disclose devices for cutting a segment or segments from citrus fruit. U.S. Pat. No. 2,321,725, for example, illustrates the most basic type of segmenter in which a blade of a single length of flat metal wire is bent to form a loop and the wire is drawn through a segment of the fruit. U.S. Pat. No. 1,794,800 illustrates another type of segmenter in which a single blade is drawn through the fruit to cut a segment or segments. Canadian Patent 470,436 illustrates a more complicated segmenter device for removing all of the segments of a citrus fruit simultaneously using a device which requires two hands to operate the operating mechanism for the moving scoops against fixed triangular blades. The segmenting device shown in the Canadian patent offers the advantage of slicing a segment or segments and then entrapping the segment by moving a curved scoop along the skin inside of the skin of the citrus fruit until a segment is trapped between the scoop and the fixed triangular cutting blades. However, the Canadian device is cumbersome to use and thus detracts from the desirability of easily removing a grapefruit segment from a grapefruit or an orange segment from a large orange.

SUMMARY OF THE INVENTION

In accordance with the present invention, one feature is to provide a one-hand operated citrus fruit segmenter which can remove one segment or only a few of adjacent segments less than all of the segments by simply moving a pad on a handle relative to the end of the handle so that the heel of the hand can be pressing the segmenter into the fruit while movement of the pad will advance a scoop along the inside of the skin of the fruit until it entraps a segment between the scoop and the fixed blades on the end of the handle. This one-handed operation is simple to perform and since less than all of the segments are to be removed, it is easy to use and easy to control.

A second feature of the invention is a unique operating mechanism for advancing a curved scoop of a citrus fruit segmenter into the citrus fruit and toward a fixed triangular blade in the citrus fruit so that the scoop is easily moved by the user with minimum effort. This feature of the invention includes a drive rack and a driven rack, the driven rack being moved by the drive rack through a pinion gear. A finger pad is connected to the drive rack. While the pad can be moved by a thumb or finger, preferably the operation is by placing the heel of the hand on the end of a handle to press the segmenter into the citrus fruit and then pulling back with a pair of fingers against multiple pads on opposite sides of the handle toward the heel of the hand in a strong and easy clasping motion.

DETAILED DESCRIPTION OF THE INVENTION

Figure 1:
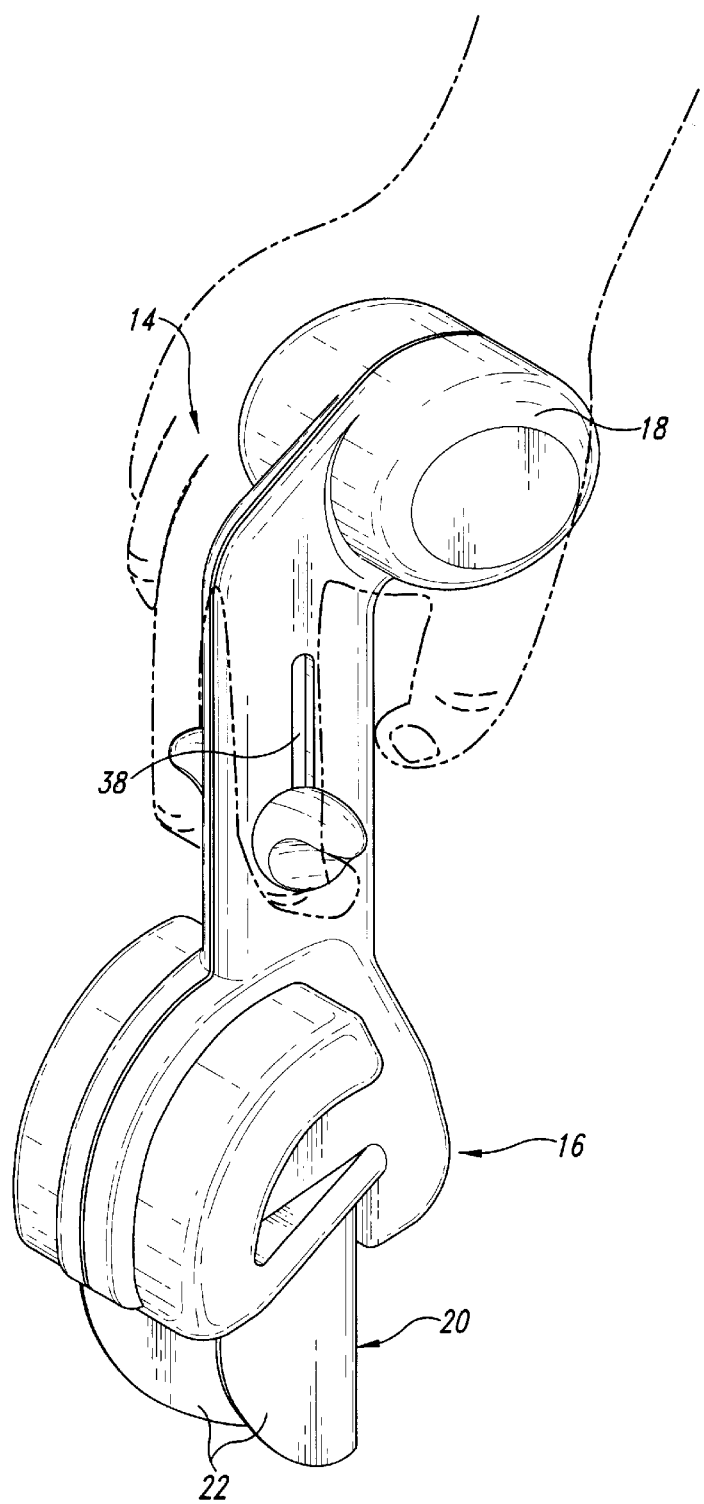
FIG. 1 is a front perspective of the segmenter illustrating the principles of the invention.

The segmenter includes a handle 12 having a grip end 14 and cutting end 16. The grip end includes a handle grip 18 which is formed to conform nicely to the heel of the user's hand for pressing the handle down into the citrus fruit. The cutting end has a triangular stainless steel blade 20 rigidly fixed to the handle by conventional attachment means. The triangular blade includes diverging segmenting surfaces 22 that are trapped in slots of the plastic handle.

Figure 2A:
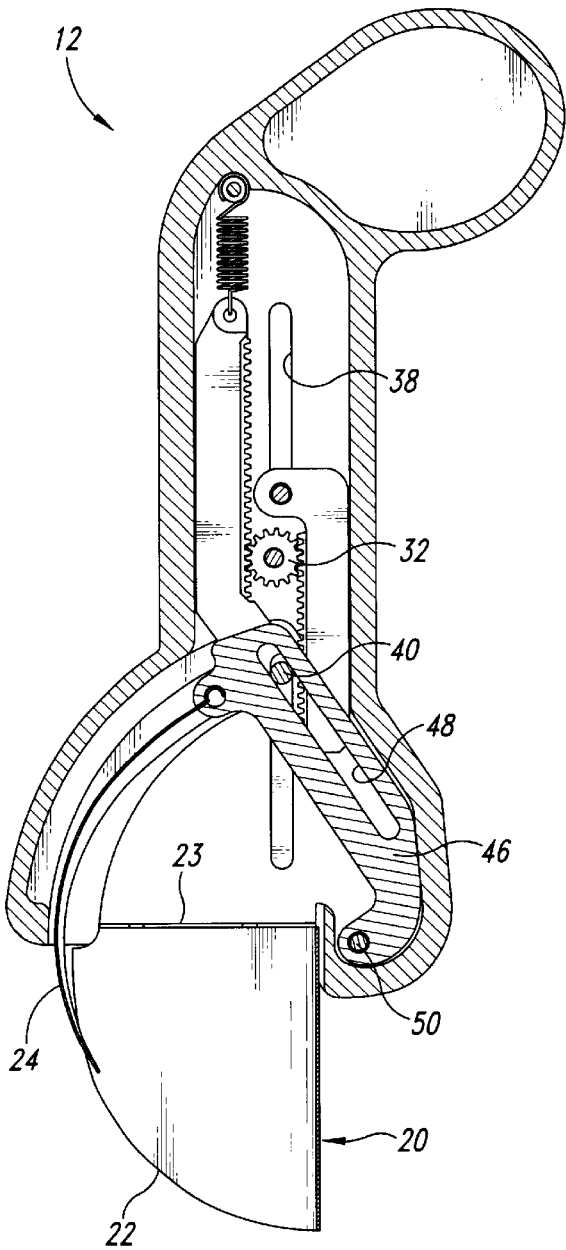
FIG. 2A is a longitudinal section of the segmenter.
Figure 2B:
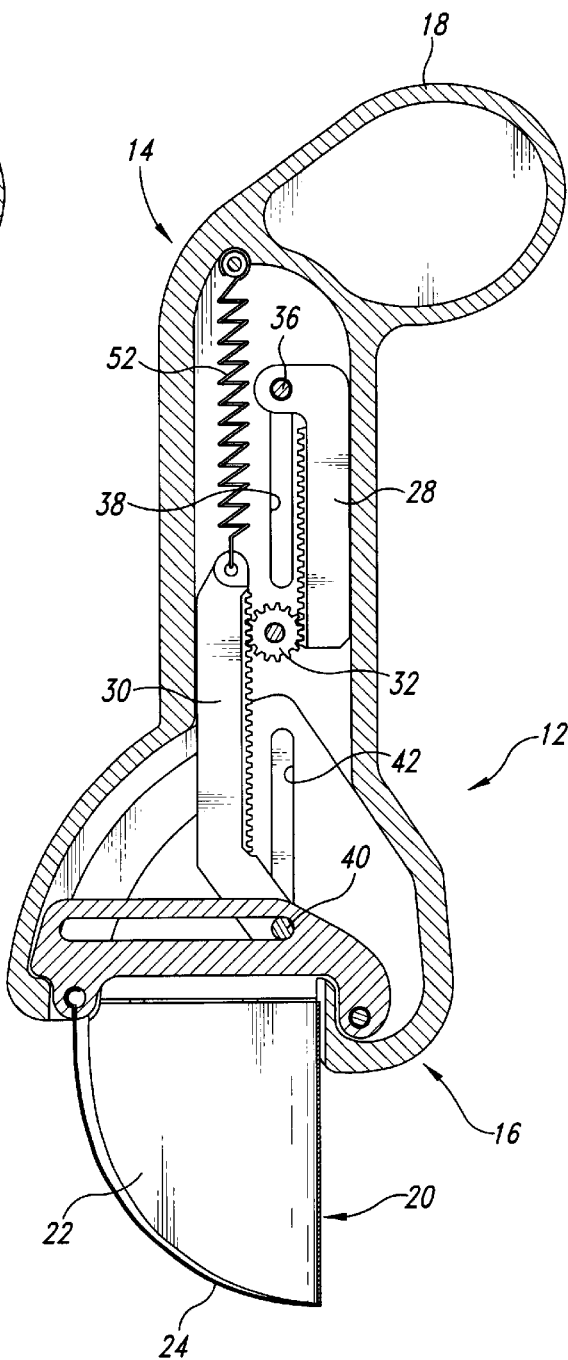
FIG. 2B is a longitudinal section showing the mechanism with the scoop advanced.

Also attached to the cutting end of the handle is a movable stainless steel scoop 24 that can move from a retracted position shown in FIG. 2A to an advanced position shown in FIG. 2B with the scoop contacting the ends of the segmenting surfaces 22 to form a closed compartment. By pushing the triangular blade into the fruit, one or more segments but less than all of the segments of the fruit can be sliced by the segmenting blade and then the scoop advanced to move along the inside of the peel of the skin of the fruit to remove the segments from the skin and entrap them between the scoop and the triangular blade. Then by withdrawing the handle, the entrapped segment or segments of fruit is removed from the rest of the fruit.

The operating mechanism for moving the scoop 24 into and out of the segment is also best shown in FIGS. 2A and 2B. The operating mechanism includes a toothed drive rack 28 and a toothed driven rack 30. The driven rack is driven in a direction opposite from the drive rack by an interconnecting pinion gear 32.

Figure 3:
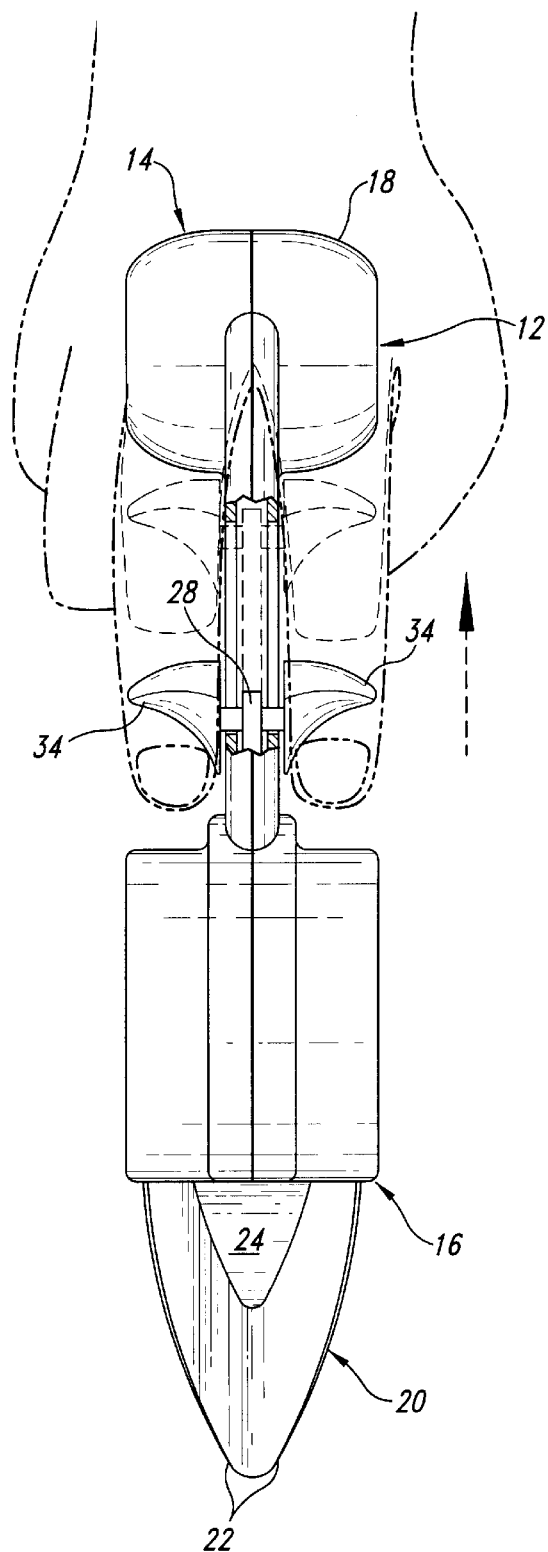
FIG. 3 is a top view of the segmenter.
Figure 4:
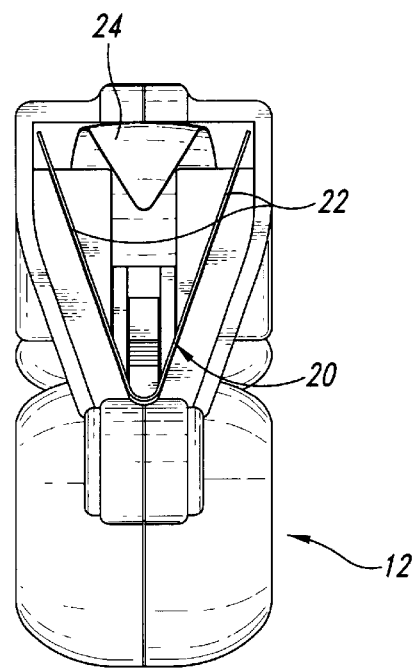
FIG. 4 is an end view of the segmenter.

As best shown in FIG. 3, a finger pad 34 is positioned on either side of the handle 12. The finger pads each are joined to a pin 36 that slides in a drive slot 38. The pin is connected to the drive rack 28. Thus, as best shown in FIG. 3, as the fingers of one hand wrap around the finger pads and are pulled back in a clasping motion while the heel of the hand is resting on the grip 18, the drive rack 28 is pulled from the position shown in FIG. 2A to the position shown in FIG. 2B.

The driven rack also is provided with a pin 40 that moves in a pair of opposed closed driven slots 42.

The scoop 24 includes an arm 46 having a guide slot 48. The arm is also pivotably mounted to the cutting end of the handle by a fixed pin 50. The scoop is advanced by the driven rack 30 moving pin 40 along the guide slot 48 forcing the segment to pivot down at the position of FIG. 2B. The scoop is retracted by a spring 52 that is attached to the driven rack such that when the finger pressure is removed from the finger pads 34 the spring will pull the driven rack back, thus pivoting the scoop away from the segmenting blades allowing the severed segment or segments of fruit to be dropped into a dish for eating.

As is readily apparent, the segmenter is operated by grasping the handle in one hand while the other hand of the user holds the cut half of grapefruit with the skin down in the normal eating position. The user then presses the fixed triangular blade down into the fruit until the ends of the segmenting surfaces 22 engage the inside of the skin of the fruit. Then by a simple clasping or pulling action, the fingers are drawn against the finger pads up towards the heel of the hand, pushing the scoop down into engagement with the segmenting surfaces to separate the segment or segments of fruit from the remainder of the fruit and the skin. The handle and blades are then lifted away from the fruit and the fingers are then removed from the finger pads to allow the scoop to open and drop out the separated segment or segments of fruit. While this unique one-handed operation can be accomplished by other mechanisms, the advantage of the racks and pinion arrangement advantageously makes the segmenter easy to use and provides sufficient force for the normal user to easily apply sufficient pressure to remove a segment. However, it is to be understood that variations can be made in the specific operating mechanism by one skilled in the art and thus the invention is not to be limited to the specific embodiments illustrated in the drawing.

What is claimed is:

1. A one hand-operated citrus fruit segmenter, comprising:
   a handle having a grip end and a cutting end and having an axial lengthwise axis extending between the grip end and the cutting end and having the distance therebetween substantially fixed;
   a grip on the grip end adapted to be grasped in the palm of a user's hand;
   a generally triangular blade fixed to said cutting end of the handle having diverging segmenting surfaces extending axially of the handle parallel to said lengthwise axis and having terminal ends;
   a single curved scoop operatively attached to the handle for movement from a retracted position withdrawn from the triangular blade to an extended position overlying the triangular blade and adjacent the terminal ends of the segmenting surfaces to form a relatively closed segment removing chamber formed by the ends of the segmenting surfaces and the scoop; and
   an operating mechanism to move the scoop between its retracted and extended positions, said operating mechanism including at least one pad extending outwardly on the side of the handle spaced below the grip adapted to be engaged by a finger of the user's hand and moved axially along said axial lengthwise axis of the handle toward said grip and relative to the handle for extending the scoop toward the triangular blade, and with the palm of the same hand engaged against the grip to hold the triangular blade against the fruit and to counteract the force moving the pad, and means attached to the handle for moving the scoop back to its retracted position.

2. The segmenter of claim 1 wherein the pad is a finger pad and has a forward face, the movement of said finger pad during extension of said scoop being axially rearward along said axial length toward said grip of said handle whereby the finger pad is moved by pulling on the finger pad while pushing with the heel of the same hand on the grip.

3. The segmenter of claim 2 wherein the handle has opposite sides, and including a second finger pad on the handle on a side opposite the first finger pad whereby the two fingers can pull on the finger pads on opposite sides of the handle.

4. The segmenter of claim 1, said operating mechanism including a drive rack powered by the user's finger, a drive rack, a pinion gear drivingly interconnecting the two racks so that retraction of the drive rack will advance the driven rack along the lengthwise axis of the handle, the scoop being attached to the driven rack, the pad being attached to the drive rack, whereby movement of the pad will move the drive rack to move the driven rack to extend the scoop.

5. The segmenter of claim 4, said operating mechanism further including a drive slot in the handle positioned along said lengthwise axis, the pad connected to the drive rack by a pin slidable in said drive slot, a driven slot in said handle, the driven rack connected to said scoop by a pin slidable in said driven slot, and a return spring for returning the driven rack when the pad is released.

6. The segmenter of claim 5, said scoop including an arm pivotably attached to said handle, said arm having a guide slot, and said operating mechanism including a pin fixed to said driven rack and movable in said guide slot wherein advancement of the pin in the guide slot pivots the arm to move the scoop toward the triangular blade.

7. The segmenter of claim 5, said handle having opposite sides, said pad being a finger pad, and a second finger pad on the handle on a side opposite the first finger pad whereby two fingers of a hand can pull on the finger pads on opposite sides of the handle for movement along the length of the handle while holding the grip end of the handle with the same hand.

8. A citrus fruit segmenter, comprising:
   a handle having a grip end and a cutter end and a longitudinal axis therebetween;
   a fixed segmenting blade on the cutter end of the handle having a pair of diverging segmented surfaces extending axially of said handle and parallel to said longitudinal axis,
   a movable scoop operatively fastened to the handle; and
   an actuating mechanism on the handle for extending the scoop to move the scoop toward the segmenting blade to form a closed compartment to entrap a fruit segment and remove the segment from the remainder of the grapefruit, the actuating mechanism including a drive rack, a driven rack, a pinion gear drivingly interconnecting the two racks so that retraction of the drive rack will advance the driven rack, a spring connected to one of said racks for retracting the driven rack to retract said scoop from within the fruit, at least one pad connected to the drive rack for retracting the drive rack, said scoop attached to the driven rack for extending upon advancement of the driven rack, said drive rack and said driven rack living between said cutter end and grip end of said handle and extending longitudinally of said handle along said longitudinal axis.

9. The segmenter of claim 8, said operating mechanism including a drive slot in the handle, said pad connected to the drive rack by a pin slidable in the drive slot, a driven slot in said handle, the driven rack connected to the scoop by a pin slidable in said driven slot.

10. The segmenter of claim 8, said scoop including an arm pivotably attached to said handle, said arm having a guide slot, and said operating mechanism including a pin connected to said driven rack and movable in said guide slot wherein advancement of the pin in the guide slot pivots the arm to move the scoop toward the triangular blade.

11. The segmenter of claim 8, said handle having opposite sides, said pad being a finger pad, a second finger pad on the side of the handle opposite from the first pad, the second finger pad also connected to the drive rack.

12. The segmenter of claim 11, said two finger pads adapted to be pulled toward the grip end of the handle by the fingers of a hand while the heel of the same hand pushes on the grip whereby pulling on the finger pads will move the drive rack to move the driven rack along said longitudinal axis of the handle to move the scoop toward the fixed segmenting blade to entrap a first segment between the scoop and the segmenting blade.

13. The segmenter of claim 12, said scoop including an arm pivotably attached to said handle, said arm having a guide slot, and said operating mechanism including a pin fixed to said driven rack and movable in said guide slot wherein advancement of the driven rack pivots the arm to move the scoop toward the segmenting blade.

14. A one-hand operated grapefruit segmenter, comprising,
   a handle having a grip end and a cutting end, the handle having a longitudinal axis;
   a grip on the grip end adapted to be grasped in the palm of a user's hand;

a generally triangular blade fixed to said cutting end of the handle having diverging segmenting surfaces extending axially outward from the cutting end of said handle and having terminal ends;

a curved scoop operatively attached to the handle for movement from a retracted position withdrawn from the triangular blade to an extended position overlying the triangular blade and the ends of the segmenting surfaces to form a relatively closed segment removing chamber formed by the ends of the segmenting surfaces and the scoop;

means for moving the scoop between its retracted and extended position using only one hand, said operating mechanism including said grip engageable by the palm of one hand for bracing the handle within the fruit and means for extending the scoop toward the triangular blade using the finger of the same hand; and said means for extending the scoop including an operating pad engageable by the finger of the same hand holding the grip of the handle and moveable lengthwise along the longitudinal axis of the handle toward said grip and moveable relative to said grip and spring means for automatically retracting the scoop when the user's finger is removed from said means for extending the scoop.

* * * * *

UNITED STATES PATENT AND TRADEMARK OFFICE
CERTIFICATE OF CORRECTION

PATENT NO.   : 6,243,952 B1
DATED        : June 12, 2001
INVENTOR(S)  : David A. Holcomb and Martin Gaard It is certified that error appears in the above-identified patent and that said Letters Patent is hereby corrected as shown below:

<u>Column 4, claim 8,</u>
Line 30, "rack living between" should read -- rack lying between --.

Signed and Sealed this

Nineteenth Day of February, 2002

Attest:

JAMES E. ROGAN
*Attesting Officer*       *Director of the United States Patent and Trademark Office*